O. BEST.
HYDROMETALLURGY OF ZINC.
APPLICATION FILED MAR. 26, 1913.
1,154,602.
Patented Sept. 28, 1915.
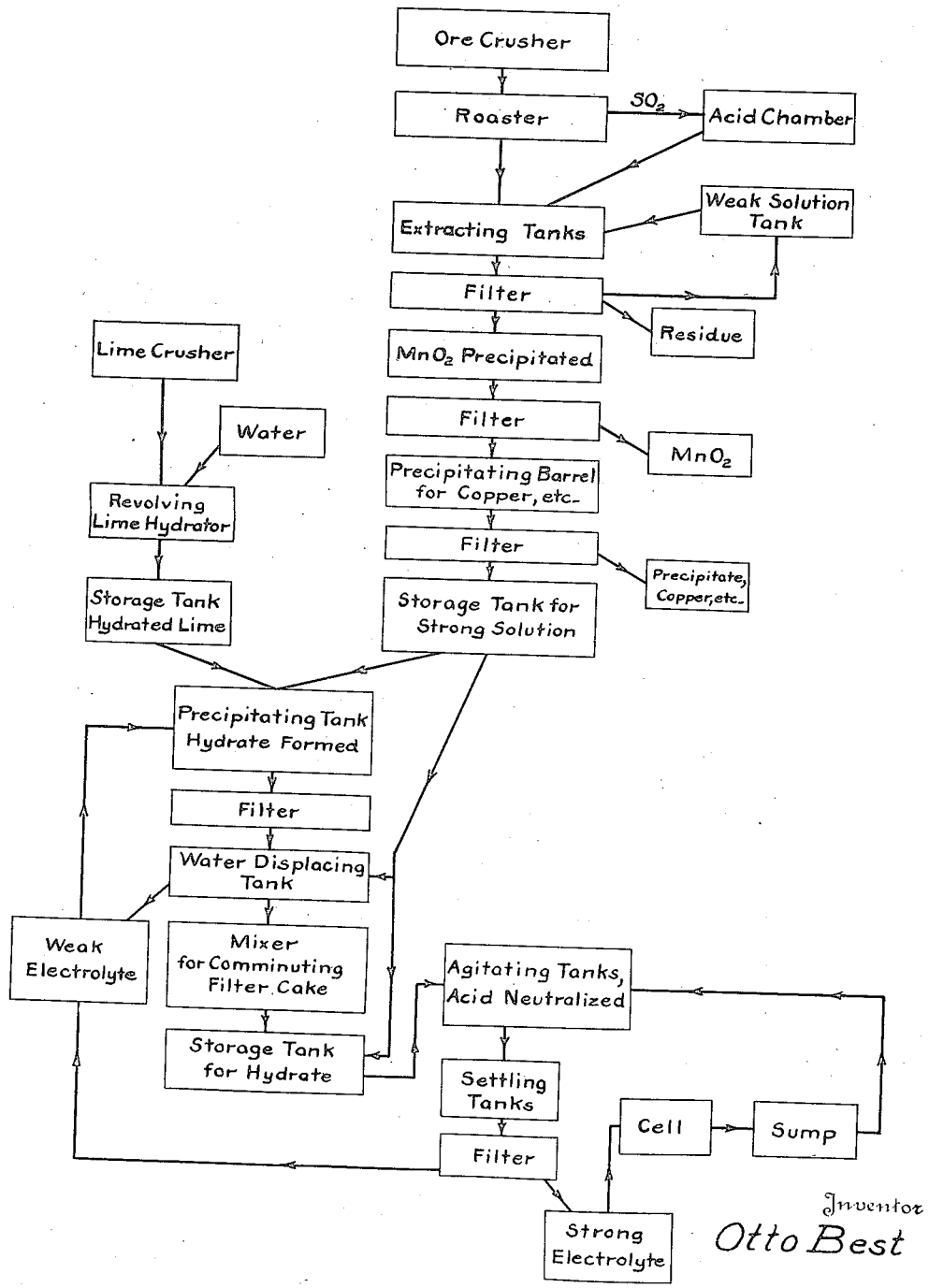
Inventor
Otto Best

UNITED STATES PATENT OFFICE.

OTTO BEST, OF SAN FRANCISCO, CALIFORNIA.

HYDROMETALLURGY OF ZINC.

1,154,602.

Specification of Letters Patent. Patented Sept. 28, 1915.

Application filed March 26, 1913. Serial No. 756,993.

*To all whom it may concern:*

Be it known that I, OTTO BEST, a citizen of the United States, residing at San Francisco, county of San Francisco, State of California, have invented certain new and useful Improvements in Hydrometallurgy of Zinc; and I do hereby declare the following to be a full, clear, and exact description of the invention, such as will enable others skilled in the art to which it appertains to make and use the same.

My invention has for its object the recovery of zinc, on a commercial scale, from zinc ores and other zinc products, by a procedure which involves the obtaining of a suitable electrolyte in which the zinc is held in solution and from which it is precipitated in a non-spongy condition capable of being readily re-melted and of high purity.

In the practice of my invention I obtain the primary solution by lixiviating the zinc-containing material by means of sulfuric acid. If the zinc-containing material is not soluble in the leaching solution, I first render it soluble in any suitable manner; as, for instance, in the case of zinc blende, by subjecting it to an oxidizing roast, preferably a sulfatizing roast, resulting in the formation of sulfate of zinc with some zinc oxid. If the zinc-containing material is already in the condition of an oxid, or if it is present as a carbonate, the roasting operation is omitted, as unnecessary. In any case, however, the soluble zinc ore or zinc-containing material is lixiviated by sulfuric acid (in slight excess) of such strength that the specific gravity of the resulting zinc sulfate solution is from 1.2 to 1.4,—preferably 1.3. Heat hastens the desired reaction and may be obtained either by lixiviating the roasted ore while it is still hot from the heat of roasting, or by making available the heat of solution of anhydrous zinc sulfate, or by making available the heat of reaction between the zinc oxid and the sulfuric acid, or any or all of them, just as needed. The solution thus obtained by the lixiviation of the zinc-containing material constitutes the primary solution of the process. It contains, ordinarily, most of the zinc, and, as impurities, some iron in the ferric and in the ferrous state, some alumina, silicic acid, manganese, copper, cadmium, bismuth and arsenic, wherever those elements are present in the material to be lixiviated. By restricting the time of lixiviation to from 15 to 30 minutes, by operating at a comparatively low temperature, and by limiting the amount of sulfuric acid in excess to a point, where the zinc extraction is practically complete, I find that I am able to reduce to a reasonable minimum the extraction of the impurities referred to. It will be understood, therefore, that, under these conditions, the primary solution contains practically all of the zinc originally present in the lixiviated material, and a relatively small amount of the extracted impurities.

In accordance with my invention, I now precipitate out of the primary solution, certain of the impurities contained therein, by means of lime, and without precipitating out the zinc. The primary solution may, if desired, be filtered out before the addition of the lime; but I find that it is preferable to treat the primary solution with the lime before filtration, for the reason that, by so doing, subsequent filtration for the removal of the residue (gangue, etc.) necessary to the further conduct of the operation, is materially facilitated,—particularly for the reason, that the lime precipitates the soluble silicic acid present, which otherwise renders the filtration difficult.

It will be particularly noted that the treatment of the primary solution with lime has for its purpose (in addition to facilitating filtration) the removal of certain impurities, such as alumina, arsenic, and the like, without precipitating any of the zinc (except possibly temporarily) as hereinafter noted, and with the precipitation of only small amounts of the copper present. In fact, if the lime should temporarily precipitate a portion of the zinc as zinc hydroxid, the zinc hydroxid thus precipitated would either react directly with the ferric or alumina-sulfate present, thereby again going into solution as zinc sulfate, and precipitating out a portion of the iron or alumina in the form of a hydroxid, or would be otherwise taken up by the concentrated zinc sulfate solution.

One way of using the lime to advantage is as follows: To the treated ore, with the residue in suspension, I add, while thoroughly stirring, slowly and gradually, a fine spray of finely divided lime suspended in water. Only so much lime is added as is necessary to precipitate the impurities according to well known equations, of which the following is an illustration:

$$Fe_2(SO_4)_3 + 3Ca(OH)_2 = 3CaSO_4 + 2Fe(OH)_3$$

The aluminum salts react in the same manner. Arsenic and silicic acid present combine with the ferric and aluminum hydrates and form insoluble compounds. The lime will precipitate temporarily $Zn(OH)_2$ also; but the latter will react on the impurities present, the same as $Ca(OH)_2$. The following equation will serve as an example of such reaction:

$$Fe_2(SO_4)_3 + 3Zn(OH)_2 = 2Fe(OH)_3 + 3ZnSO_4$$

During all of this time, air is being passed through the solution to oxidize the iron. While the iron is not completely precipitated by the action of the lime alone, as the iron in solution is mostly present in the ferrous state, and while it cannot be completely precipitated by oxidation with air alone in a slightly acid or neutral solution, yet it will quickly and quantitatively precipitate, if air is passed through the solution containing a small excess of lime or calcium carbonate. For this reason, a small excess of lime or calcium carbonate is employed, and oxidation, and therefore precipitation of the iron is completed within from 15 to 30 minutes. At the same time, as hereinbefore noted, alumina, arsenic and other impurities are precipitated by the lime.

If ordinary slaked lime (milk of lime) is used, in the treatment described, a good many impurities are removed, some of them quantitatively. The employment of milk of lime, however, has some disadvantages, inasmuch as more or less water is thereby introduced into the solution, diluting the zinc sulfate, and a more or less lumpy precipitate is formed, in the concentrated zinc sulfate solution, causing a loss of zinc as hydrate. Furthermore, the precipitate is rather voluminous, while the filter cake is relatively thick, and cracks easily, making washing difficult and thereby limiting the capacity and kind of apparatus used for filtration. I prefer, therefore, instead of using milk of lime for this purification, the use of burnt "unslaked" lime, and to grind it to a fineness of 100 mesh, or preferably 200 mesh and to then mix the same with an excess of water,—say about two parts by weight of water to one part of ground unslaked lime. This I call "drowning" the lime. Or, I may mix the unslaked lime with a corresponding amount of weak zinc sulfate solution, and immediately after drowning I may add it to the impure solution. This ground "unslaked" lime, when properly prepared by mixing it quickly and thoroughly with water, does not generate much heat, nor increase in volume materially, but remains granular in form and is, in action and appearance, as different from slaked lime as are the resultant precipitates.

By the conjoint use of the lime treatment and air agitation, I attain the same results as far as purification of the liquor is concerned. That is to say, I remove iron, alumina, silicia acid, quantitatively, arsenic and some other impurities almost entirely, and I have the additional advantage of less dilution of the zinc sulfate with practically no lumps, and, therefore, no loss of zinc hydroxid. I also obtain a less voluminous precipitate, which filters considerably better and forms a filter-press cake that is thinner and more granular, and will not crack, and for this reason can easily and completely be washed free from the soluble salts, such as zinc sulfate, and other metallic sulfates. Hydrated lime acts similarly and I wish it to be understood that my invention includes the use of both hydrated and unhydrated lime. After the lime treatment, the mixture is filtered, preferably, in a continuous filter. The filtration is fast, and the undiluted filtrate, having a specific gravity of from 1.2 to 1.4 is kept separate from the washings, which latter are effected with comparatively small quantities of water. The washings (with the addition of sulfuric acid) are used for the lixiviation of subsequent ore charges, thus utilizing this weak liquor without diluting the primary solution. We now have in solution the zinc as sulfate, and most of the copper, cadmium, some manganese, and also some salts of the alkalis and alkaline earths. The next step in the process is the treatment of the above solution (of a specific gravity of 1.2 to 1.4) with calcium permanganate, or other alkaline permanganate, in the presence of lime or calcium carbonate or other bases.

As manganese salts are very objectionable in the electrolytic precipitation of zinc, causing very considerable disturbances, particularly attacking soft lead anodes, it is very essential to the attainment of the best results, that every trace of manganese salts be removed from the solution, before it enters the electrolytic cell. I accordingly add to the zinc sulfate solution sufficient lime or calcium carbonate to neutralize the free sulfuric acid formed, when the manganese salts present are acted upon by the permanganate, as per the following equations, occurring simultaneously:

$$Ca(MnO_4)_2 + 3MnSO_4 + 2H_2O = CaSO_4 + 5MnO_2 + 2H_2SO_4 2H_2SO_4 + 2Ca(OH)_2 + 2CaSO_4 + 4H_2O$$

In adding the lime or calcium carbonate to neutralize the free sulfuric acid formed, I do so while subjecting the solution to vigorous agitation, (but not with air, as this will bring the precipitated $MnO_2$ in solution again)—preferably at about 70° C., the relative amount of lime and alkaline earth permanganate required being governed by the above equations. An excess of lime must be avoided, as it precipitates copper and zinc as hydrates. The manganese dioxid, thus precipitated, is removed by filtration, preferably preceded by settling and decantation. It is then thoroughly washed with water and dried and is in a fine physical state. A part of it can be used over again for the manufacture of alkaline or alkaline earth permanganate and the rest of it can be disposed of as paint, or for many other useful purposes.

In order to remove any copper, cadmium, and traces of other heavy metals present in the solution, I treat the solution with an excess of granulated (or, preferably, powdered) zinc. If this is done without agitation the zinc will soon be covered with metallic copper and cadmium and will act very slowly and finally cease to act at all. I have ascertained that by vigorous shaking or stirring of the zinc sulfate solution, (either neutral or slightly acid) with an excess of granulated or powdered zinc, every trace of copper, cadmium and other heavy metals is removed, particularly hot, but even in the cold, and within a comparatively short time, say 10 to 15 minutes, provided a large excess of zinc is present. This shaking and agitation has the following result: The copper, cadmium, and other metals, precipitated on the surface of the metallic zinc, are rubbed off, by particles of zinc rubbing against particles of zinc, or against the walls of the vessel, thus exposing new metallic zinc for attack, and thereby accelerating the reaction and completing the same in a minimum of time. In practice, I carry out this removal of the copper, cadmium and other heavy metals, in a horizontal revolving vessel of cylindrical form, having staves projecting inside, say one inch, and about one foot or so apart. In this apparatus, the solution and the zinc are not only intimately mixed, but fresh zinc surfaces are continually exposed, as described above. If the solution is quickly drawn off, the precipitated copper and other heavy metals will stay in suspension in the heavy zinc sulfate solution and will be removed with it, while the heavy metallic zinc stays behind and can be used over again, the necessary addition of zinc being made from time to time. This procedure, as described, can be carried out either intermittently or continuously. In the latter case I fill the horizontal revolving drum with granulated zinc. The perforated inlet (with stuffing box) is approximately one inch in diameter and extends inside the drum. The outlet approximately two inches in diameter extends inside the drum and is also perforated. This arrangement allows the drum to be filled slightly (one inch) less than half full of solution. Under these conditions, with the drum filled with granulated zinc and slightly less than half filled with solution, no portion of the latter can pass through the drum without coming in repeated intimate contact with the granulated zinc. As the drum revolves and the solution flows in constantly, a precipitation and removal of the heavy metals is accomplished automatically and yet completely. It is desirable to work with hot solution, but as previous operations continuously provide hot solution this may be taken advantage of.

The zinc sulfate solution drawn off, with the copper and other heavy metals in suspension, is filtered with or without previous settling, and the metals are carefully washed with water, pressed or melted into anodes, or may enter anodes with an indifferent cement like plaster of Paris, whereupon the anodes are ready for further refining. Small particles of metallic zinc, also cadmium may first be removed, if desired, by treatment with dilute acid, this treatment will also increase the capacity of the precipitated metals for filtration, as will also heating the solution. The solution is now practically pure zinc sulfate, and can only contain as impurities, salts of the alkalis and alkaline earth metals. As much of this zinc sulfate solution as is needed is used to fill and keep filled the electrolytic vat. The zinc sulfate solution thus obtained, I now precipitate the zinc as a hydroxid, a carbonate or other compounds, insoluble in water, but easily soluble in weak acid. The precipitation can be effected with caustic alkali, alkaline carbonate, sulfid, or alkaline earth, but preferably with lime, as described hereinbefore. By this treatment, I obtain zinc hydroxid, carbonate, sulfid or other water-insoluble compound, easily soluble in weak acids, and the sulfates of alkalis or alkaline earths. If lime is used, a mixture of zinc hydroxid and gypsum is formed. Pure lime should, of course, be used, if available, although it was found in practice that iron, alumina and many other impurities in the burnt lime are not easily soluble, and that, under the described working conditions, few, if any, of the impurities of the lime will go into solution. Instead of ordinary slack lime, I prefer in this step of the process, as in the previously described purification stage, burnt, ground, unslaked lime, or hydrated lime, for the same reasons.

I effect the precipitation of the zinc from the solution in the form of hydroxid, preferably as follows: Strong zinc sulfate solution and wash water, and displacement water (the two latter weak in $ZnSO_4$) are mixed to get a solution which is always of about the same density. This zinc sulfate solution and the lime are simultaneously fed from opposite sides into a large precipitating tank containing a powerful agitator. The lime is suspended in from 2 to 3 parts of water and is added gradually in a very finely divided stream (as, for instance, through a nozzle or the like) so as to avoid lumping. Under these conditions it is found that no lumps are formed. This avoidance of lumping is due to the fact, that there is no high concentration of either the $ZnSO_4$ or of the lime, or of both and particularly because the lime is not added to a strong zinc sulfate solution in a heavy stream or vice versa.

In concentrated zinc sulfate solution, the lime is immediately surrounded by an insoluble film of $Zn(OH_2)+CaSO_4 2H_2O$, which mechanically surrounds the lime and prevents further action on the zinc sulfate solution and vice versa. Too much dilution of the solutions and the lime would call for the use of apparatus of too large a size. I therefore only dilute with the amount of weak zinc sulfate solution obtained as wash water from gypsum and displacement water, obtained from the zinc hydroxid gypsum mixture, and I prevent lumping as follows: I first place in a large tank of say 10,000 gallons having a powerful agitator, a quantity of weak $ZnSO_4$ solution. I then run in simultaneously the strong zinc sulfate solution and the lime on the opposite sides of the tank in such proportions that at no time, is either the zinc sulfate or the lime in large excess. The strong zinc sulfate solution is preferably run in close to the bottom of the vessel by means of a pump or otherwise, and lime in a finely divided state is run in from the top of opposite side of the vessel. I prefer to have always a small excess of zinc sulfate. Under these conditions, neither strong zinc sulfate nor strong lime can ever be present. The lime I use preferably is burnt, ground, unslaked lime, suspended in from 2 to 3 parts of water, which lime forms less lumps than ordinary milk of lime, besides the other advantages enumerated above. As a further precaution, I add the lime in a finely divided stream, by means of a spray nozzle or other means operating under pressure. Under these conditions, I get a precipitate free of lumps, devoid of free lime particles, capable of ready filtration, washable, and whose water is easily displaceable by electrolyte liquor.

The zinc hydroxid or other water-insoluble zinc compound is now filtered and washed, to remove all soluble salts, particularly soluble chlorids, that corrode soft lead anodes. It is a particular advantage of this process that soluble salts cannot accumulate, but can be removed through this step, whenever desired and thus forming a practically chemically pure zinc hydroxid, zinc carbonate, or the like, mixed with gypsum, if lime has been used as a precipitant. The gypsum does not affect the electrolysis, whether it is in solution or in suspension.

The water-insoluble zinc compound, as, for instance, zinc hydroxid gypsum mixture is now ready to be introduced into the "electrolytic cycle". I have found, however, that it cannot be introduced into the electrolytic cycle in this form without causing disturbances and without interfering with the ideal conditions of constancy aimed at in the "electrolytic cycle". In the first place, the very voluminous precipitate contains a considerable amount of water, which would dilute the electrolyte when the acid solution from the cell is run over this zinc hydroxid to neutralize the free sulfuric acid produced in said solution. Furthermore, from a practical standpoint, the precipitated zinc hydroxid or other insoluble zinc compound should have as little bulk as possible, and should be capable of easy filtration, and the water contained in it should be capable of displacement by zinc sulfate solution of a strength equal to or greater than that of the electrolyte. Furthermore, this displacement should be possible with a minimum of solution, and the zinc hydroxid should be readily soluble in weak acids. So also, the remaining gypsum (in case of lime treatment) should settle fairly quickly and completely in the strong zinc sulfate solution. Likewise, the heavy residue (gypsum) should filter easily, so that zinc sulfate can be completely washed out therefrom with a minimum of water, forming a small amount of weak zinc sulfate solution, whose zinc is subsequently precipitated again as zinc hydroxid.

In order to obtain a less voluminous zinc hydroxid and one which is better adapted for filtration, I either pass through the precipitate suspended in water, carbon dioxid (washed fuel gas) or gas from the lime kiln to form basic zinc carbonate, for which purpose only a small amount of carbon dioxid is necessary, (it being desirable to stop before the solution thickens), or I use for the precipitation either finely divided unslaked lime or hydrated lime as hereinbefore described for the purification of impure sulfate solution and with like resultant advantages. Furthermore, magnesium oxid in a finely divided state, say after passing through a sieve of 100 mesh, (or better 200 mesh) gives a very desirable precipitate which can easily be washed and whose water is readily displaced by electrolyte. The precipitate, thus prepared, is now in the right condition, after the displacement of the water by the electrolyte or zinc sulfate solution, to be introduced into the electrolyte cycle. This replacement or displacement of water contained in the precipitate avoids the expense of evaporation and keeps the electrolyte of practically a constant specific gravity. I have now available for use in the electrolytic cell a solution obtained as hereinbefore described which, by reason of the treatment described is a solution of practically pure zinc salt. This solution may be electrolyzed as such. If, however, I wish to use in the electrolytic cell some other zinc salt, as, for instance, zinc acetate, I add to the zinc sulfate solution an equivalent amount of calcium acetate. The resulting reaction is as follows:

$$ZnSO_4 + Ca(C_2H_3O_2)_2 = Zn(C_2H_3O_2)_2 + CaSO_4.$$

Or, if I wish to use zinc chlorid in the electrolytic cell, I add to the zinc sulfate solution an equivalent amount of calcium chlorid, according to the following reaction:

$$ZnSO_4 + CaCl_2 = ZnCl_2 + CaSO_4.$$

In either case, I wash out the soluble zinc acetate or the soluble zinc chlorid from the insoluble gypsum and evaporate, if necessary, to the density desired in the cell. Or I may precipitate the weak solution as zinc hydrate, use the strong solution only. When the cell is thus charged with the solution of zinc acetate, zinc chlorid, or the like, it does not require replenishing, inasmuch as the acetic acid, or the hydrochloric acid, as the case may be, will act merely as a carrier of zinc, with little mechanical loss.

From the foregoing, it will be seen that I may use in the electrolytic cycle another acid than the one used for extraction. In fact, any acid may be used that has a soluble lime salt, and that may be neutralized in a dilute state by zinc hydroxid or other water-insoluble zinc compound, soluble in weak acid or acids. Naturally, I can charge the electrolytic cell with any suitable zinc salt from any other source, inasmuch as it will require but very slight replenishment after it has been once charged.

In using in the cell bi-sulfite of zinc as the soluble electrolyte and a water-insoluble zinc compound, easily soluble in weak acid, monosulfid of zinc, the reactions would be as follows:

$$ZnH_2(SO_3)_2 \text{ electrolyzed, gives}$$
$$Zn + SO_2 + H_2SO_4$$

no free oxygen being produced.

$$H_2SO_4 + Ca(OH_2) = CaSO_4 + 2H_2O,$$

or $$H_2SO_4 + CaCO_3 = CaSO_4 + CO_2 + H_2O.$$

In either case, the gypsum formed is removed by filtration or settling. Finally, $$ZnSO_3 + H_2O + SO_2 = ZnH_2(SO_3)_2.$$

The carrier for the zinc in this case is sulfurous acid, bringing the water-insoluble zinc compound (zinc monosulfite) into solution as zinc bisulfite, to be returned to the electrolytic cell. The other molecule of sulfurous acid acts as a depolarizer at the anode and is transformed into sulfuric acid. The sulfuric acid thus produced is then removed as gypsum by means of lime.

If temporarily part of the sulfurous acid should be neutralized by lime, it would form with the excess of sulfurous acid bisulfite of calcium, which is a soluble compound and would react, with free sulfuric acid (as long as free sulfuric acid is present) in accordance with the following equation:

$$CaH_2(SO_3)_2 + H_2SO_4 = 2SO_2 + 2H_2O + CaSO_4.$$

If zinc sulfate be used, it is used with a density of approximately 1.2 to 1.4, preferably about 1.27 to 1.30. This is the density of highest electric conductivity for zinc sulfate and therefore requires a current of the least voltage with the best watt yield. Also soft lead anode corrosion is less than in weaker solution. The zinc sulfate solution is obtained directly of this strength, without the trouble and expense of evaporation, by means of my process as hereinbefore described, and, if the conditions are otherwise properly established and maintained, as described, the solution will always remain practically constant in specific gravity. Furthermore, the electrolyte can be replaced as often as desired, inasmuch as there is always at hand new pure zinc sulfate solution having the same density. In fact, strong zinc sulfate solution is constantly needed for displacement of water in zinc hydrate or zinc hydrate gypsum mixture.

By means of the electrolysis, pure zinc is deposited on the cathode and sulfuric acid is formed at the anode. The best watt yield is with an acidity between 0% and 3% sulfuric acid. The excess of free sulfuric acid is neutralized by mixing it with zinc hydroxid, saturated with strong zinc sulfate solution (as hereinbefore described) and is returned to the cell as zinc sulfate, with little or no sulfuric acid and of the same strength in zinc sulfate. The neutralization can be effected continuously, or by running the acid electrolyte into a tank, adding sufficient of the zinc hydroxid gypsum mixture to make it neutral or almost neutral, allowing the gypsum now free of zinc hydroxid, to settle, (preferably in a continuous settler and concentrator), and returning the practically clear, neutral or slightly acid zinc sulfate to the cell. The heavy residue of pure, precipitated gypsum, containing electrolyte liquor is filtered and washed (for instance, by means of a continuous filter) and can be disposed of as an available product, for many industries; while weak solution (wash water) is treated with lime as hereinbefore described, and the precipitate is used over again after displacement of the water with strong zinc sulfate solution. By means of this precipitation of the wash water, evaporation is avoided. If, for any reason, the electrolyte becomes impure, either because of impurities in the lime, or otherwise, it is replaced by pure zinc sulfate solution, while the impure electrolyte removed is purified as described.

The cathodes may be made of zinc, as for instance, thin rolled sheets of zinc of $\frac{1}{8}$ inch or $\frac{1}{16}$ inch in thickness, or even less, may be used. These sheets may be rolled from pure electrolytic zinc, and the sectors, including the original sheets, together with the zinc deposited thereon by the electrolysis of the solution can be shipped to the point of destination or use, or, before shipment, may be re-cast into ingots. New thin zinc cathode sheets may then be fastened to the spider, for the next succeeding operation. If iron cathodes are employed, they may, for their proper protection, first be coated with a thin layer of copper, or zinc or both. The metallic layer or layers thus applied is intended to remain on the iron cathodes during continued use, but may have to be replaced from time to time. In order that the layer or layers of zinc deposited from the electrolytic cell upon the coated cathodes may readily come off and separate therefrom. I paint the coated cathodes with a solution of strong zinc sulfate and zinc hydroxid or zinc oxid (basic zinc sulfate solution), or a very concentrated zinc sulfate solution (preferably hot) with zinc hydroxid or oxid in suspension. By this expedient, the subsequent layers of zinc deposited on the coated cathodes can be separated readily, no matter what metal is used for the cathode.

Precipitating a coat of metallic copper or zinc on the iron cathode allows me to use rough, unfinished plates, which make a much less expensive cathode. Near the center of the cathode, where no zinc or other metal is deposited by the current, it is best to paint the cathode with an acid-proof paint, or protect it with some other acid-proof covering, as otherwise the disk would be attacked by the free sulfuric acid, and the electrolyte would also soon be contaminated with iron or other salts.

The anodes are preferably of soft lead. They will corrode very quickly in the presence of chlorids, manganese salts, and other impurities, and it is a particular merit of my invention that because of the high purity of the zinc sulfate solution and its high concentration as obtained by this process, the soft lead anodes employed are hardly attacked, except for a thin film of lead peroxid at the surface, that practically remains for a long period of time, for the above reasons.

Referring generally to the entire procedure hereinbefore described, I desire to state that it is of very great importance to the obtaining of the best results that the ores should be ground properly, before being roasted and lixiviated. In this connection, I may say, that I prefer to grind to a powder between the 80 and 100 mesh sieve, with the production of as small an amount of "fines" as possible. It will, of course, be understood that I do not limit the grinding to any particular degree of fineness, but I endeavor to exclude the "fines" as much as possible, particularly material passing a 200 mesh sieve. This is because the subsequent roasting of the fines is accompanied with the formation of more acid-insoluble zinc compounds than are formed from the coarser particles, and, furthermore, because filtration of the fines is very difficult.

It will be understood that instead of lixiviating with dilute sulfuric acid, I can lixiviate with any other suitable acid, as, for instance, hydrochloric acid, or any appropriate acid.

In the accompanying drawing, the process of the present invention is represented in diagram with respect to its various steps and the apparatus in which they are practised. As indicated in this diagram, the ore passes from the crusher to the roaster and thence to the extracting tanks, where the ore is extracted with sulfuric acid of suitable strength to give the desired solution. This acid can be in part recovered from the sulfur dioxid escaping from the roaster, in suitable acid chambers, and in part from the weak solution resulting from the subsequent washing of the filtered ore. From the extracting tanks the ore passes to the filter where the residue is removed, after which the manganese dioxid is precipitated from the ore and filtered off. Copper and similar constituents are next precipitated and filtered off, and the resulting strong solution is ready for use in the subsequent stages of the process.

For precipitating the zinc hydrate, lime, from the lime crusher, is mixed with water and hydrated, and the hydrated lime is used as desired for precipitating the strong zinc sulfate solution. The precipitate is filtered, and the water therein displaced with the strong electrolyte, after which the precipitate is maintained in suspension and fed to the acid neutralizing tanks as desired. From the cell, the acid electrolyte passes to a sump where suspended matter, such as gypsum, is removed; after which the electrolyte passes to the acid neutralizing tanks where the acid is neutralized with the zinc hydroxid precipitate. After settling to remove any suspended matter such as gypsum, which is filtered off, the electrolyte is returned to the cell. The water from the water displacing tank, and the wash water from the filter, are returned to the precipitating tank for recovering their zinc values.

As appears from the diagram, the neutralization and electro deposition are effected cyclically, by means of the freshly precipitated zinc compound, without however diluting the electrolyte, the strength, as well as the purity, of the electrolyte being thus maintained.

Having thus described my invention what I claim is:

1. In the recovery of zinc from ores and other materials containing the same in an acid-soluble form, the method of obtaining a solution which comprises extracting the zinc with sulfuric acid, and treating the resulting solution before separation from the undissolved material with lime in amount insufficient to precipitate the zinc; substantially as described.

2. In the recovery of zinc from ores and other materials containing the same in an acid-soluble form, the method of obtaining a solution which comprises extracting the zinc with sulfuric acid, and treating the resulting solution before separation from the undissolved material with finely divided unslaked lime in amount insufficient to precipitate the zinc; substantially as described.

3. In the recovery of zinc from ores and other materials containing the same, the method of obtaining a solution which comprises roasting the material, extracting the roasted material while still hot from the roasting step with sulfuric acid of such strength as to give a sulfate solution of a specific gravity within the range of 1.2 to 1.4, and treating the resulting solution before separation from the undissolved material with lime in amount insufficient to precipitate the zinc; substantially as described.

4. In the recovery of zinc from ores and other materials containing the same, the method of obtaining a solution which comprises roasting the material, lixiviating it with sulfuric acid, treating the resultant product with lime before filtration, filtering out the solution, washing the residue and collecting the filtrate and washwater separately; substantially as described.

5. In the recovery of zinc from ores and other materials containing the same, the method of obtaining a solution which comprises roasting the material, lixiviating it with sulfuric acid, treating the resultant product with lime before filtration, filtering out the solution, and treating it with calcium permanganate in the presence of lime, so as to precipitate as dioxid any manganese present in the solution; substantially as described.

6. In the recovery of zinc from ores and other materials containing the same, the method of obtaining a solution which comprises roasting the material, lixiviating it with sulfuric acid, treating the resultant product with lime before filtration, filtering out the solution, treating it with calcium permanganate in the presence of lime, so as to precipitate as dioxid any manganese present in the solution, filtering the resultant solution and washing the precipitated manganese dioxid; substantially as described.

7. In the recovery of zinc from ores and other materials containing the same, the method of obtaining a solution which comprises roasting the material, lixiviating it with sulfuric acid, treating the resultant product with lime, filtering and precipitating traces of arsenic and any copper, cadmium and other heavy metals, that may be present, by vigorously agitating the solution with an excess of zinc; substantially as described.

8. In the recovery of zinc from ores and other materials containing the same, the method of obtaining a solution, which comprises roasting the material, lixiviating it with sulfuric acid, treating the resultant product with lime, filtering, precipitating traces of arsenic and any copper, cadmium and other heavy metals, that may be present, by vigorously agitating the solution with an excess of zinc, and decanting off the strong zinc sulfate solution with the precipitated copper, cadmium, etc., in suspension to separate it from the metallic zinc which immediately settles; substantially as described.

9. In the recovery of zinc from ores and other materials containing the same, the method of obtaining a solution which comprises roasting the material, lixiviating it with sulfuric acid, treating the resultant product with lime, filtering, precipitating traces of arsenic and any copper, cadmium, and other heavy metals, that may be present, by vigorously agitating the solution with an excess of zinc, decanting off the strong zinc sulfate solution with the precipitated copper, cadmium, etc., in suspension, to separate it from the metallic zinc which immediately settles, filtering and washing the copper and other metals and forming them into anodes for further refining; substantially as described.

10. In the recovery of zinc from ores and other materials containing the same, the method of obtaining a solution which consists in roasting the material, lixiviating it with sulfuric acid, treating the resultant product with lime, filtering, precipitating traces of arsenic and any copper, cadmium, and other heavy metals, that may be present, by vigorously agitating the solution with an excess of zinc, decanting off the strong sulfate solution with the precipitated copper, cadmium, etc., in suspension, to separate it from the metallic zinc, which immediately settles, and precipitating zinc from the solution as a water-insoluble compound; substantially as described.

11. In the recovery of zinc from ores and other materials containing the same, the method of obtaining a solution which consists in roasting the material, lixiviating it with sulfuric acid, treating the resultant product with lime, filtering, precipitating traces of arsenic and any copper, cadmium, and other heavy metals, that may be present, by vigorously agitating the solution with an excess of zinc, decanting off the strong zinc sulfate solution with the precipitated copper, cadmium, etc., in suspension, to separate it from the metallic zinc, which immediately settles, and precipitating zinc from the solution as a water-insoluble compound, washing to remove any soluble salts present, particularly chlorids and displacing the water by strong zinc sulfate solution; substantially as described.

12. In the recovery of zinc from material containing the same, lixiviating the material with sulfuric acid of such a strength as to give a zinc sulfate solution of a specific gravity of 1.2 to 1.4 and treating the resultant solution with lime; substantially as described.

13. In the recovery of zinc from materials containing the same, lixiviating the material with sulfuric acid, and precipitating out any manganese that is present by treating the solution with calcium permanganate in the presence of lime; substantially as described.

14. In the recovery of zinc from material containing the same, lixiviating the material with sulfuric acid, and precipitating out any manganese that is present by treating the solution with calcium permanganate in the presence of lime and at about 70° C.; substantially as described.

15. In the recovery of zinc from materials containing the same, lixiviating the material with sulfuric acid, precipitating out any manganese present by means of calcium permanganate in the presence of lime, and precipitating out traces of arsenic and any copper, cadmium, and other heavy metals that may be present, by vigorously agitating the solution of zinc sulfate with an excess of zinc; substantially as described.

16. In the recovery of zinc from material containing the same, lixiviating the material with sulfuric acid, precipitating out its impurities, leaving a practically pure strong zinc sulfate solution of a density within the range of 1.27 to 1.30, and precipitating out of said solution a zinc hydroxid gypsum mixture by treating the same with lime; substantially as described.

17. In the recovery of zinc from material containing the same, lixiviating the material with sulfuric acid, precipitating out its impurities, leaving a practically pure strong zinc sulfate solution of a density within the range of 1.27 to 1.30, and precipitating out of said solution a zinc hydroxid gypsum mixture by treating the same with lime and passing carbon dioxid through the suspended precipitate, thereby forming basic zinc carbonate; substantially as described.

18. In the recovery of zinc from material containing the same, lixiviating the material with sulfuric acid, precipitating out its impurities, leaving a practically pure strong zinc sulfate solution of a density within the range of 1.27 to 1.30, and precipitating out of said solution a zinc hydroxid gypsum mixture by treating the same with lime and passing carbon dioxid through the suspended precipitate, thereby forming basic zinc carbonate, the introduction of the carbon dioxid being interrupted before the product begins to thicken; substantially as described.

19. In the recovery of zinc from material containing the same, lixiviating the material with sulfuric acid, precipitating out its impurities, leaving a practically pure, strong zinc sulfate solution of a density within the range of 1.27 to 1.30, depositing the zinc from said solution by electrolysis upon a suitable cathode and simultaneously forming free acid at the anode, and neutralizing the acid by running it over a zinc hydroxid gypsum mixture previously washed and saturated with strong zinc sulfate solution; substantially as described.

20. In the recovery of zinc from roasted zinc ore, the method of obtaining a strong zinc sulfate solution, with a relatively small amount of impurities therein, which comprises lixiviating the roasted ore while still hot with a small excess of sulfuric acid, thereby likewise effecting a saving in fuel, inasmuch as the heat of the roasted ore is further supplemented by the heat of neutralization of zinc oxid and sulfuric acid and by the heat of solution of anhydrous zinc sulfate; substantially as described.

21. In the recovery of zinc from ore and other material containing the same, the method of obtaining a purified zinc sulfate solution, which comprises lixiviating the material with sulfuric acid to obtain a primary solution, and removing any iron, alumina and silica contained therein, together with most of the other metallic impurities, but with little loss of copper, by treating the primary solution with lime and air; whereby, in addition to the purification, subsequent filtration is correspondingly improved, mainly through the removal of soluble silicic acid; substantially as described.

22. In the recovery of zinc from ores and other materials in which it is contained, the method of obtaining a less voluminous, more granular, and more readily filterable and washable precipitate, which consists in precipitating a zinc hydroxid gypsum mixture from a pure zinc sulfate solution by means of burnt unslaked lime; substantially as described.

23. In the recovery of zinc from ores and other materials in which it is contained, the method of obtaining a less voluminous, more granular, and more readily filterable and washable precipitate, which consists in precipitating a zinc hydroxid gypsum mixture from a pure zinc sulfate solution by means of burnt unslaked lime mixed with about twice its weight of water; substantially as described.

24. In the recovery of zinc from ores and other materials containing the same, the method of obtaining a primary solution, which comprises roasting the material, extracting the roasted material while still hot from the roasting step with sulfuric acid, and treating the resulting solution before separation of the undissolved material and with thorough stirring air and with lime in a finely divided and granular condition and in amount insufficient to precipitate the zinc; substantially as described.

25. In the recovery of zinc from ores and other materials containing the same, the method of obtaining a primary solution, which comprises grinding the material with the practical avoidance of fines, subjecting the material thus ground to a sulfatic roast, extracting the roasted ore while still hot from the roasting step with sulfuric acid in slight excess of that necessary for dissolving the zinc, and such strength as to give a sulfate solution of a specific gravity of about 1.2 to 1.4, adding controlled amounts of granular hydrated or unslaked lime and passing air through the mixture to precipitate impurities and finally separating the solution from the undissolved residue.

26. In the recovery of zinc from material containing the same, lixiviating the material with sulfuric acid, precipitating out its impurities, leaving a practically pure, strong zinc sulfate solution of a density of about 1.2 to 1.4, precipitating the zinc from such solution in the form of a zinc hydroxid gypsum mixture by means of lime, washing such precipitate and displacing the water therein by means of zinc sulfate solution of the density above indicated, depositing the zinc from a zinc sulfate solution of such density by electrolysis and thereby forming free acid, and neutralizing the acid and maintaining the desired concentration of the zinc sulfate solution by circulating the same through such zinc-hydroxid gypsum mixture.

27. In the recovery of zinc from materials containing the same, the process which comprises precipitating the zinc from its purified solutions in the form of hydroxid, washing the precipitate and displacing the water therein by a solution of a purified zinc salt suitable for electrolytic deposition of zinc therefrom, subjecting such a solution to electrolysis to deposit the zinc therefrom and thereby forming free acid, and neutralizing the acid and maintaining the desired concentration of the solution by circulating the same through such zinc hydroxid precipitate.

28. In the recovery of zinc from materials containing the same, the process which comprises precipitating the zinc from its purified solutions in the form of a zinc hydroxid-gypsum mixture by treatment with lime, washing the precipitate and displacing the water therein by a solution of zinc sulfate of a density about 1.2 to 1.4, subjecting a solution of purified zinc sulfate of such density to electrolysis to deposit the zinc therefrom and thereby forming free acid, and neutralizing the acid and maintaining the desired concentration of the solution by circulating the same through such zinc hydroxid gypsum mixture.

29. In the recovery of zinc from materials containing the same, the process which comprises electrolytically depositing the zinc from a purified zinc sulfate solution of a density of about 1.2 to 1.4, and thereby forming free acid, and neutralizing the acid and maintaining the concentration of such solution by circulating the same through a freshly precipitated soluble zinc salt.

30. In the recovery of zinc from materials containing the same, the process which comprises electrolytically depositing the zinc from a purified zinc sulfate solution of a density of about 1.2 to 1.4, and thereby forming free acid, and neutralizing the acid and maintaining the concentration of such solution by circulating the same through a freshly precipitated zinc hydroxid gypsum mixture.

31. In the recovery of zinc from material containing the same, the process which comprises electrolytically depositing the zinc from a purified zinc sulfate solution of a density of about 1.2 to 1.4, and thereby forming free acid, and neutralizing the acid and maintaining the concentration of such solution by circulating the same through a freshly precipitated zinc hydroxid in which the water has been displaced by a zinc sulfate solution of suitable density.

32. In the recovery of zinc from material containing the same, the process which comprises electrolytically depositing the zinc from a purified zinc sulfate solution of a density of about 1.2 to 1.4, and thereby forming free acid, and neutralizing the acid and maintaining the concentration of such solution by circulating the same through a freshly precipitated zinc hydroxid gypsum mixture in which the water has been displaced by a zinc sulfate solution of suitable density.

In testimony whereof I affix my signature, in presence of two witnesses.

OTTO BEST.

Witnesses:
 HERBERT R. HANLEY,
 JAMES B. CATHCART.